United States Patent
Nagarajan et al.

(10) Patent No.: US 7,099,327 B1
(45) Date of Patent: Aug. 29, 2006

(54) DATA COMMUNICATIONS NETWORKS WITH HIGH PERFORMANCE AND RELIABILITY

(75) Inventors: Ramesh Nagarajan, Somerset, NJ (US); Muhammad A Qureshi, Metuchen, NJ (US); Steven A Surek, Leonardo, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 747 days.

(21) Appl. No.: 09/687,348

(22) Filed: Oct. 12, 2000

(51) Int. Cl.
*H04L 12/28* (2006.01)

(52) U.S. Cl. ..................................... 370/394

(58) Field of Classification Search ........ 370/216–228, 370/389, 392, 394
See application file for complete search history.

(56) References Cited

U.S. PATENT DOCUMENTS

| | | | |
|---|---|---|---|
| 5,627,822 A | 5/1997 | Edmaier et al. | 370/218 |
| 5,671,213 A * | 9/1997 | Kurano | 370/218 |
| 5,671,215 A * | 9/1997 | Foglar | 370/227 |
| 5,796,720 A | 8/1998 | Yoshida et al. | 370/245 |
| 5,933,412 A * | 8/1999 | Choudhury et al. | 370/218 |
| 6,205,488 B1 * | 3/2001 | Casey et al. | 709/238 |
| 6,269,077 B1 * | 7/2001 | Matsumura et al. | 370/218 |
| 6,271,946 B1 * | 8/2001 | Chang et al. | 370/392 |
| 6,295,296 B1 * | 9/2001 | Tappan | 370/392 |
| 6,304,569 B1 * | 10/2001 | Rau | 370/395.2 |
| 6,356,544 B1 * | 3/2002 | O'Connor | 370/353 |
| 6,359,857 B1 * | 3/2002 | Ahmad et al. | 370/217 |
| 6,366,558 B1 * | 4/2002 | Howes et al. | 370/219 |
| 6,421,317 B1 * | 7/2002 | Denecheau et al. | 370/222 |
| 6,466,574 B1 * | 10/2002 | Fujisaki et al. | 370/356 |
| 6,477,141 B1 * | 11/2002 | Izawa et al. | 370/219 |
| 6,477,166 B1 * | 11/2002 | Sanzi et al. | 370/395.1 |
| 6,496,477 B1 * | 12/2002 | Perkins et al. | 370/228 |
| 6,611,532 B1 * | 8/2003 | Madour et al. | 370/466 |
| 6,697,361 B1 * | 2/2004 | Fredette et al. | 370/389 |
| 6,853,641 B1 * | 2/2005 | Lindhorst-Ko et al. | 370/394 |

FOREIGN PATENT DOCUMENTS

| | | |
|---|---|---|
| EP | 0 868 052 A1 | 9/1998 |
| GB | 2 346 280 A | 8/2000 |

* cited by examiner

*Primary Examiner*—Andrew C. Lee (57) ABSTRACT

An Optical Transport Network (OTN) (comprising a number of OTN nodes) uses an Internet Protocol (IP) based control plane (out-of-band signaling on a separate wavelength). Each OTN node of the IP-based control plane performs dual-feeding and dual-selecting of signaling messages on diverse signaling paths. The IP-based control plane establishes a pair of physically disjoint signaling paths between every set of neighboring OTN nodes (pre-computed and pre-established physically disjoint primary and secondary message paths in the IP-based control plane).

7 Claims, 14 Drawing Sheets

Nagarajan-Qureshi-Surek 16-13-2

Nagarajan-Qureshi-Surek 16-13-2

FIG. 14

DATA COMMUNICATIONS NETWORKS WITH HIGH PERFORMANCE AND RELIABILITY

FIELD OF THE INVENTION

This invention relates generally to communications and, more particularly, to optical communications.

BACKGROUND OF THE INVENTION

Recently, it has been realized that the use of a signaling network is important for next generation intelligent optical networks for providing services like real time point-and-click provisioning of optical channels, optical layer protection and restoration, optical layer network topology auto-discovery and optical layer bandwidth management. However, the performance and reliability of any signaling network (referred to herein as a control plane) is very important for successful deployment and usage of these services.

For a number of reasons, such as easier feature enhancement and wider access of features to customers, the Internet Protocol (IP) has been emerging as the technology of choice to implement a control plane for Optical Transport Networks (OTNs). Unfortunately, the use of an IP-based control plane is not without its problems. For example, one form of routing used in an IP-based control plane is open shortest path first (OSPF) routing. Detection of a failure in OSPF relies on "hello" messages and the expiration interval of timers associated with these hello messages. Given this, time to detect a failure is dictated by two factors. First, the frequency of hello messages, which must be computed while keeping in mind that resources, such as bandwidth and processing, required for them should not affect real traffic. Second, expiration values of timers, which must be chosen while realizing that congestion situations in the network should not be interpreted as failures. In practice, OSPF is slow to converge since the time between hello messages and the expiration timer values, for a reasonable size network, are typically chosen on the order of seconds which makes the OSPF convergence time (failure detection+update of routing tables) on the order of several seconds (or sometimes maybe a few minutes). In case of a failure in such an IP-based control plane, this slow convergence of OSPF routing degrades the setup time performance of new or existing connection requests in the system from on the order of tens of milliseconds to several seconds or minutes. Moreover, when the IP-based control plane failure is coupled with an OTN failure then restoration performance of the system gets severely impacted—a situation that customers may perceive as intolerable.

SUMMARY OF THE INVENTION

As a result of the above, we have observed that failure detection in an IP-based control plane must not rely on the timer-based standard OSPF mechanism. Indeed, we propose an architecture that, in case of any failure in the IP-based control plane, can avoid slow convergence of OSPF without compromising scalability. In accordance with the invention, a node of a control plane multi-feeds packets over diverse communications paths, and multi-selects packets received from diverse communications paths.

In an embodiment of the invention, an OTN (comprising a number of OTN nodes) uses an IP-based control plane (out-of-band signaling on a separate wavelength). Each OTN node of the IP-based control plane performs dual-feeding and dual-selecting of signaling messages on diverse signaling paths. The IP-based control plane establishes a pair of physically disjoint signaling paths between every set of neighboring OTN nodes (pre-computed and pre-established physically disjoint primary and secondary message paths in the IP-based control plane).

DETAILED DESCRIPTION

Since an IP-based control plane is, in essence, another packet transport network for signaling messages, it is also referred to herein as a data communications network (DCN). As noted above, the DCN can have some failures of its own such as cable cuts. These may or may not be coupled with OTN failures depending on DCN and OTN topology. When the DCN has an independent failure, it may impact a new connection setup in the OTN as no signaling paths may be available in the DCN. When the DCN has a failure coupled with an OTN failure, it may not be possible to restore existing connections in the OTN even though alternate paths are available in the OTN. Clearly, this implies that the DCN has to be as reliable as the OTN itself and one needs fast restoration in the DCN itself in order to carry out the same for the OTN. Fast restoration in the DCN is quite challenging. However, a DCN can be constructed such that restoration time does not compromise OTN performance. In particular, and in accordance with the invention, a DCN node multi-feeds packets over diverse communications paths, and multi-selects packets received from diverse communications paths. For the purposes of the example described herein two diverse paths are used, i.e., a DCN node dual-feeds packets over diverse communications paths, and dual-selects packets received from diverse communications paths.

Figure 1:
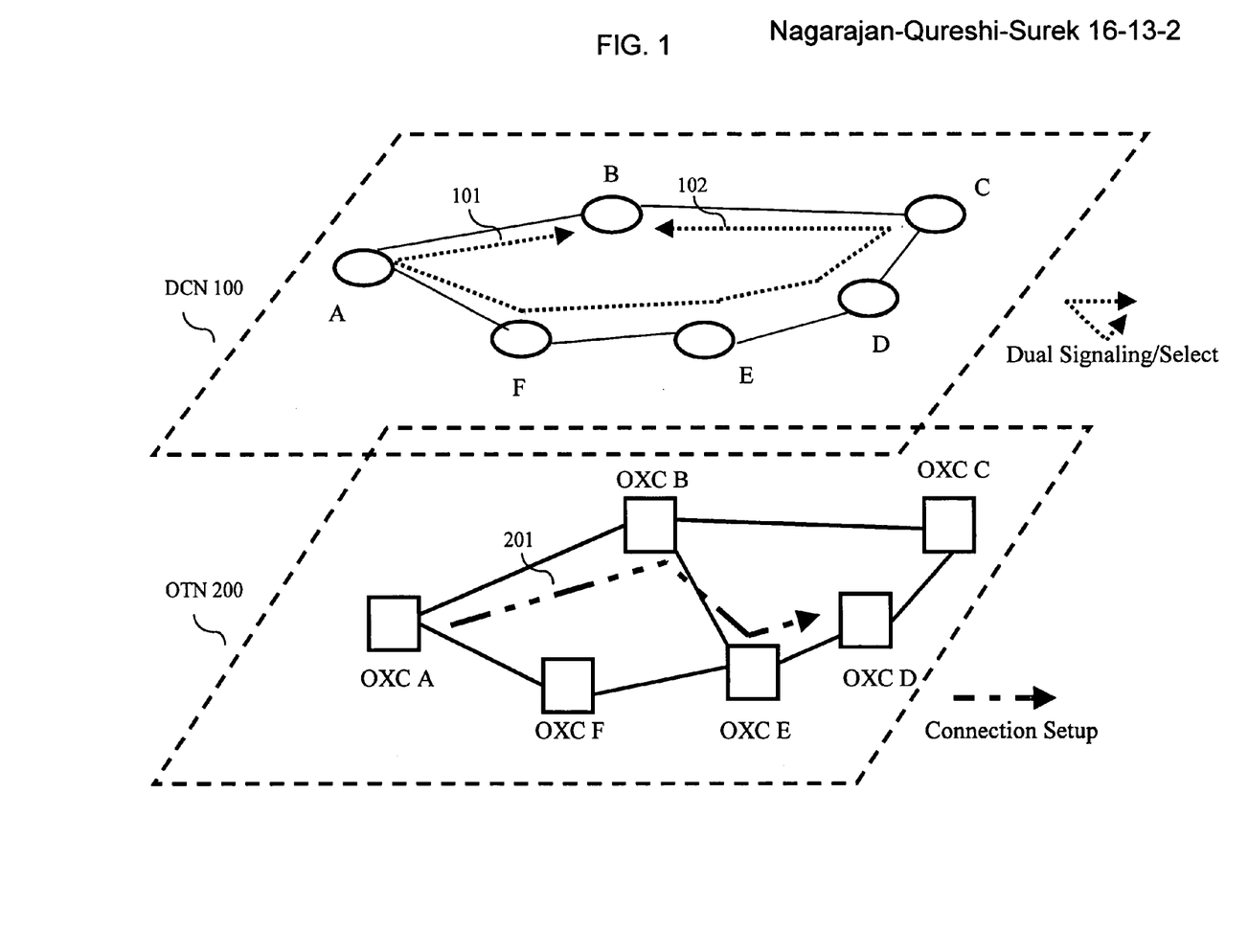
FIG. 1 shows an illustrative optical communications system embodying the principles of the invention.

An illustrative optical communications system, in accordance with the principles of the invention is shown in FIG. 1. Other than the inventive concept, the elements shown in FIG. 1 are well-known and will not be described in detail. For example, OTN 200 is an optical transport network comprising a number of optical cross-connect (OXC) nodes, e.g., OXC A, OXC B, OXC C, OXC D, OXC E and OXC F, having an illustrative OTN topology as shown. Also, although shown as a single block element, each node (e.g., node A of DCN 100) includes stored-program-control processors, memory, and appropriate interface cards (not shown in FIG. 1). Except as noted below, it is assumed that OTN 200 conforms to a synchronous optical network (SONET). (It should be noted that other elements such as gateways to provide access to, e.g., OTN 200, and user endpoints, are left off to simplify the description.) In addition, the inventive concept uses conventional programming techniques, which as such, will not be described herein.

As noted above, OTN 200 comprises OXC A, OXC B, OXC C, OXC D, OXC E and OXC F. The OTN 200 utilizes an IP-based control plane (out-of-band signaling on a separate wavelength) as represented by DCN 100. As such, DCN 100 comprises nodes A, B, C, D, E and F. (In effect, this is a logical separation since each node—physically—performs both transport and signaling.) DCN 100 is a packet transport network for all the signaling messages necessary for connection signaling (e.g., setup and teardown), failure notification and OAMP (operations, administration, maintenance and provisioning) messaging in OTN 200. (Other than the inventive concept, signaling messages are known in the art and will not be described herein.) As will become apparent from the description below, it is desirable that the DCN topology be independent of the OTN topology (however, it should be noted that common physical routes—while not required—are not excluded). DCN 100 utilizes any of a number of transport technologies such as, but not limited to, optical, SONET or Ethernet. This makes the DCN portable and applicable to any automatic switched transport network. FIG. 1 illustrates the inventive concept for a sample connection setup in OTN 200 along path 201 (A-B-E-D). In addition, FIG. 1 shows the corresponding transport pathways in DCN 100. Note, that DCN 100 and OTN 200 do not share the same topology as DCN 100 is missing the OTN link B-E.

Figure 2:
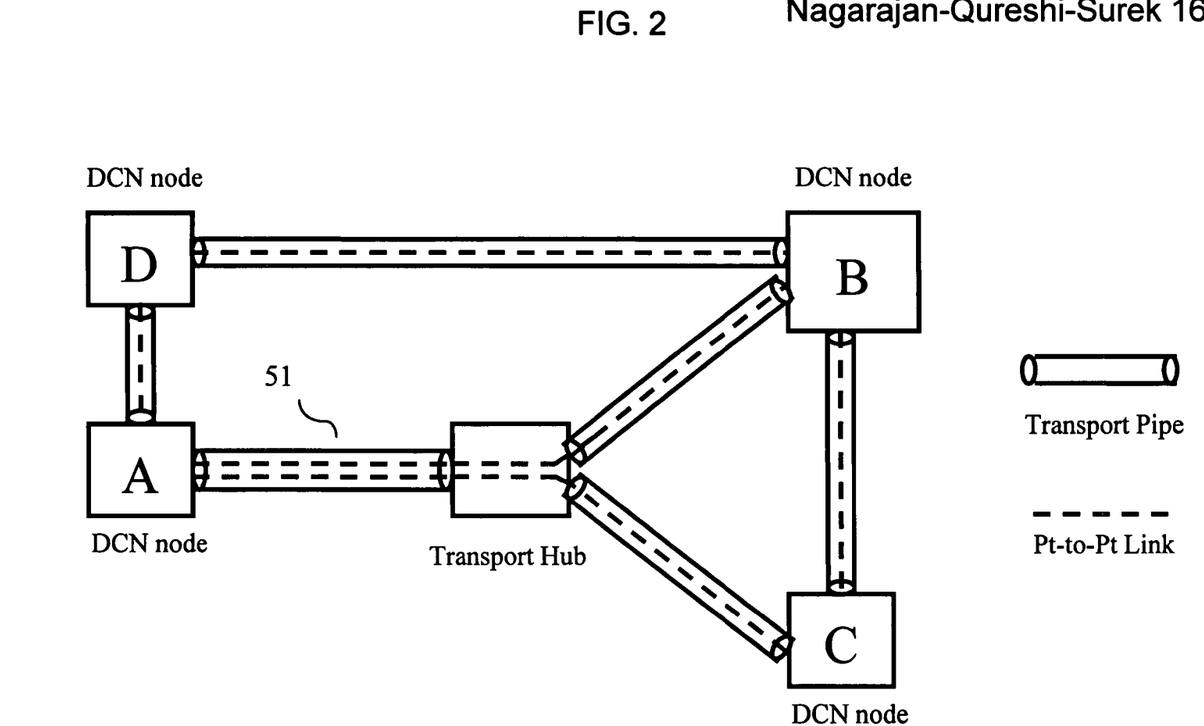
FIG. 2 shows an optical communication system.
Figure 3:
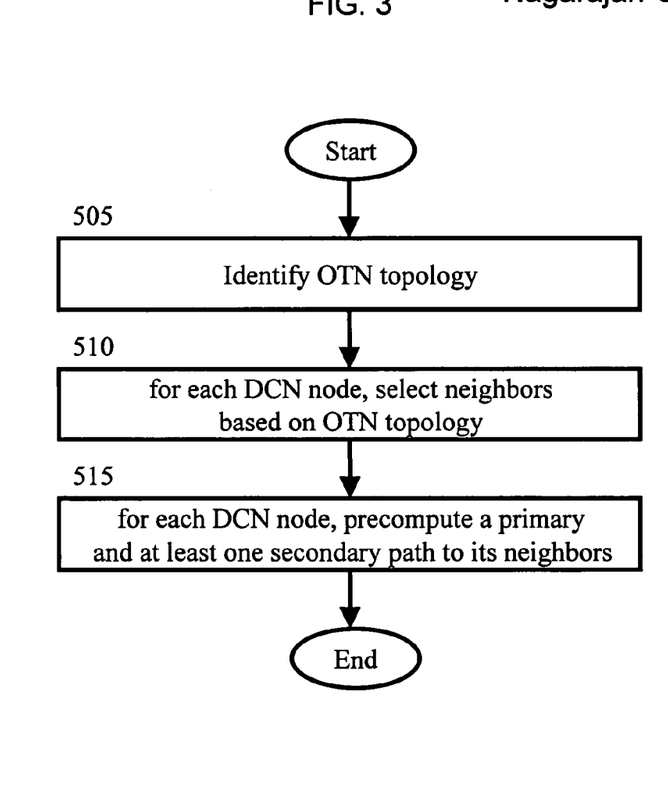
FIG. 3 shows an illustrative flow chart, embodying the principles of the invention, for use in the optical communications system of FIG. 1.

As noted above, the multi-feeding and multi-select operations require the DCN to have physically diverse, precomputed and pre-planned, paths—in this example, one primary path and one secondary path. Physically diverse primary and secondary paths makes sure that in case of a failure in the DCN there is always a path readily available to exchange the control information (signaling). This thus enables the DCN to avoid slow OSPF convergence. However to compute physically diverse paths, the DCN needs additional information about the mapping of IP (data) paths to the physical transport. For example, for the moment consider the DCN network illustrated in FIG. 2. In this figure, it can be observed that DCN node A has point-to-point links with DCN node B and DCN node C routed on the same physical link 51. This type of information is not available at the IP layer. Therefore if the DCN tries to compute a primary and a secondary path based only on the IP layer information then it can end up computing paths that are not physically diverse. To make sure that the primary and secondary paths remain physically diverse, the DCN needs a mapping of its nodes to the underlying physical transport. An illustrative flow chart for creating a DCN topology in accordance with the principles of the invention is shown in FIG. 3 for the optical communication system illustrated in FIG. 1. Illustratively, two diverse paths are computed. In step 505, the OTN topology is identified in each DCN node. (For optical path computation purposes, OTN topology information is passed to each DCN node through a link state exchange protocol as known in the art (e.g., the Link Management Protocol (LMP)). In step 510, each DCN node identifies its neighboring DCN nodes according to the underlying OTN topology determined in step 505. In step 515, each DCN node, for each of its identified neighbors, precomputes a primary and a secondary path to each of its identified neighbors (this information is stored in a routing table for each respective DCN node (not shown)).

Illustratively, multiprotocol label switching (MPLS) is used for the DCN network for explicitly routing control information along the precomputed paths. Unlike hop-by-hop OSPF routing, MPLS cleanly separates the routing and the forwarding functions to provide explicit routing. Further, because of this separation, MPLS can easily isolate precomputed MPLS paths (based on forwarding function) from any changes in the routing function because of a failure. (OSPF can also provide explicit routing capabilities through its explicit routing function but it requires that complete route must be carried in each IP packet (waste of bandwidth). Also OSPF explicit routing is limited to path lengths of nine hops that will put a constraint on number of hops in an optical path.)

As noted above, the DCN only provides a primary MPLS path and a secondary MPLS path between nodes that are neighbors according to the OTN topology. There are two reasons for this requirement. First, if primary and secondary MPLS paths are allowed between every pair of DCN nodes then on the order of $n^2$ bi-directional MPLS paths are required, where n is the number of nodes in the DCN network. This restricts the scalability of the DCN. Second, if the primary and secondary paths are allowed between DCN neighboring nodes, instead of DCN nodes that are neighbors according to the OTN topology, then the DCN network can become unnecessarily complex, which may also affect its performance. Given these two facts, if the MPLS paths are nailed between OTN neighbors then the control information needs to traverse only one label switched path (LSP) to go between two neighboring OTN nodes.

Figure 4:
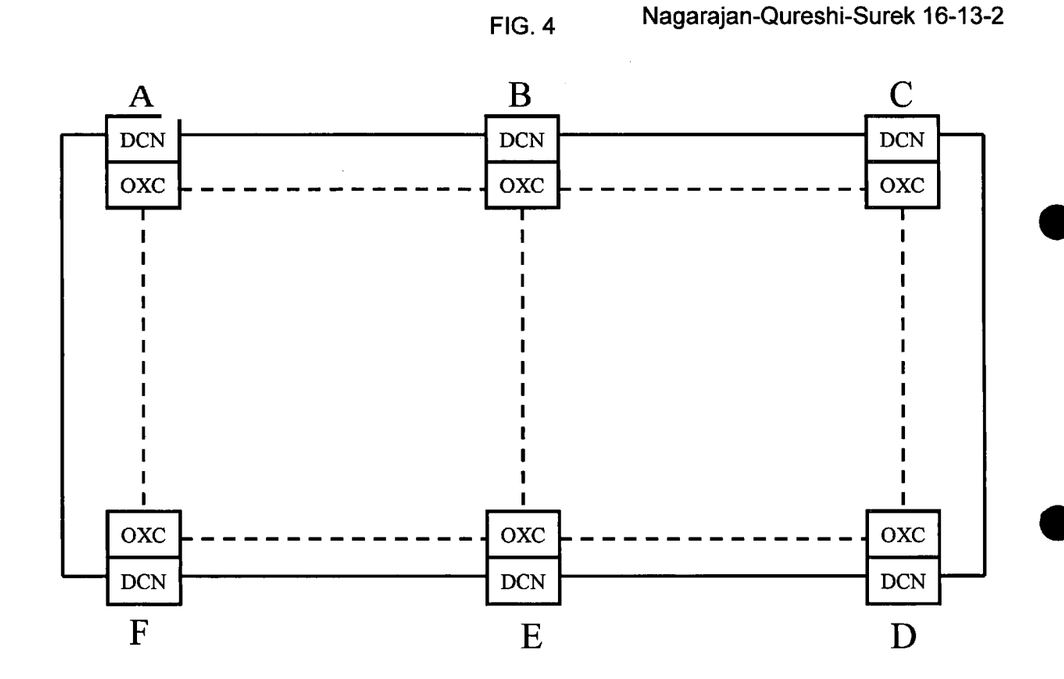
FIG. 4 shows another view of the optical communications system shown in FIG. 1.

The OXC and DCN networks illustrated in FIG. 1 are redrawn in FIG. 4. In accordance with the inventive concept, and illustratively using MLPS, primary and secondary LSPs are required between neighboring OXC nodes: (A,B), (A,F), (E,F), (B,E), (B,C), (C,D), and (D,E). As mentioned above, the topologies of OTN 100 and DCN 200 are different, e.g., there is no DCN connection between nodes B and E. Now, suppose there is a request to setup an optical connection between OXC nodes A and D. Further suppose that A-B-E-D is the path computed for this connection request using the OTN topology (path 201 of FIG. 1). To setup this connection, signaling messages need to be sent between nodes (A,B), (B,E) and (E,D). Given LSPs between neighboring OXC nodes, messages will only have to traverse a single LSP between each pair of these nodes.

Figure 5:
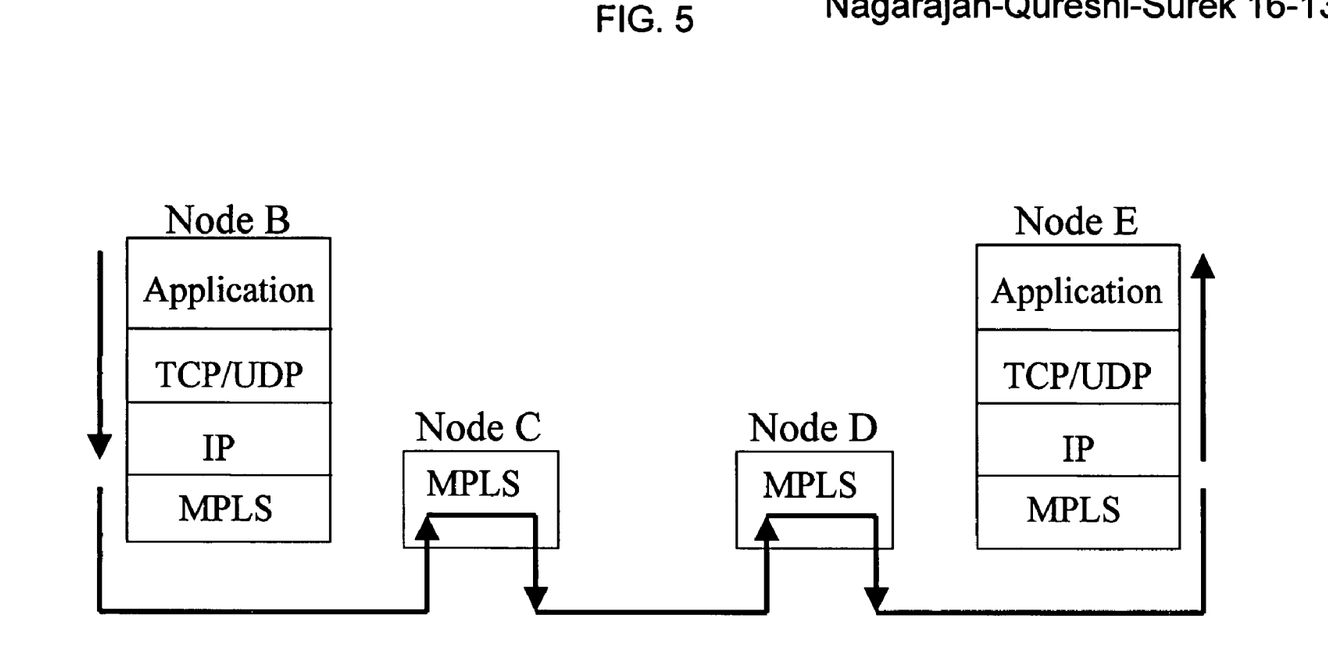
FIGS. 5 and 6 show illustrative MLPS signaling between DCN nodes of the optical communications system shown in FIGS. 1 and 4.
Figure 6:
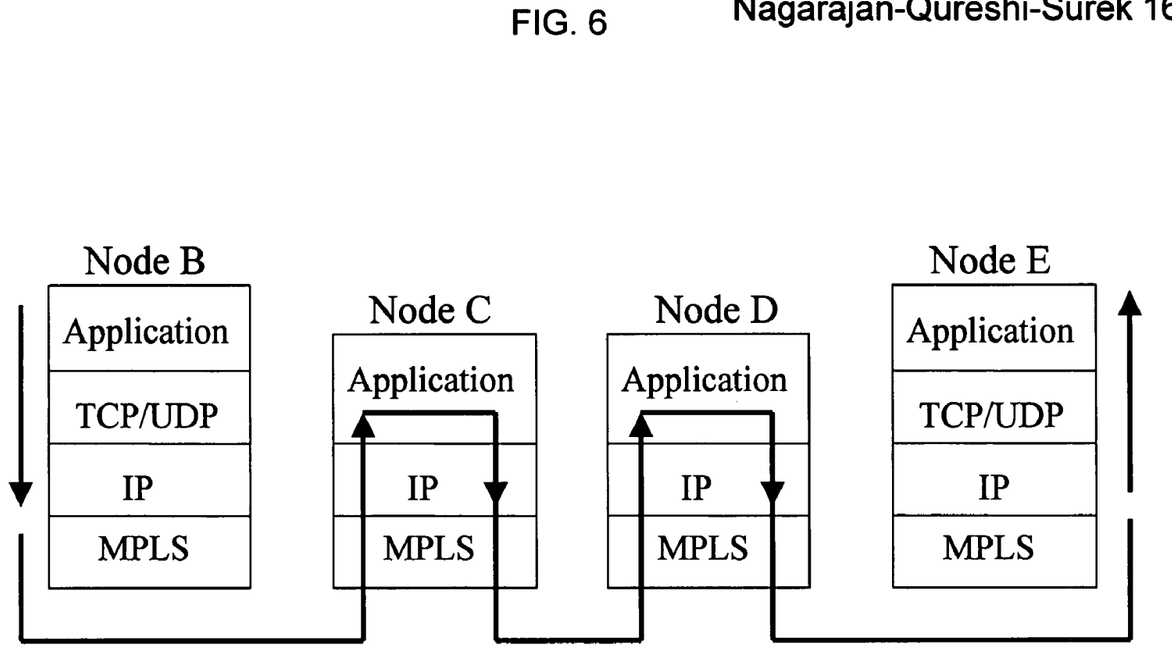
Figure 7:
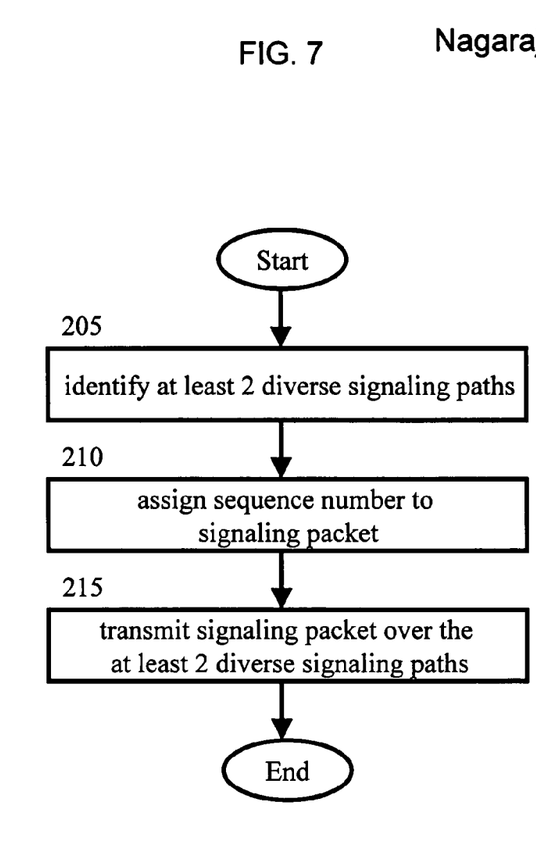
FIGS. 7 and 8 show illustrative flow charts, embodying the principles of the invention, for use in a node of the optical communications system of FIG. 1.

FIG. 5 illustrates an LSP between two neighboring OXC nodes, B and E, that are not neighbors in the DCN network (as shown in FIGS. 1 and 4). (Other than the inventive concept, the various protocols shown in the protocol stacks of FIG. 7 are well-known and will not be described herein. For example, consider the Transmission Control Protocol/User Datagram Protocol (TCP/UDP).) This LSP passes through intermediate DCN nodes C and D at the MPLS forwarding function level. (Note, that if MPLS paths are allowed between DCN neighbors then setup messages may need to travel many LSPs to go between two adjacent OXC nodes in the computed path. This is shown in FIG. 6, which illustrates the sequence of LSPs signaling messages needed to travel between neighboring OXC nodes B and E in DCN network 100.)

In accordance with the inventive concept, each DCN performs a multi-select function (or mechanism or operation) and a multi-feeding (or replicating) function, which occurs between every pair of adjacent OTN nodes. Referring back to FIG. 1, this is illustrated by node A and node B (multi-selection from, or multi-feeding to, other DCN nodes are not shown for simplicity). Illustratively, a duplicating function is performed. Node A performs dual-feeding of signaling packets to node B as represented by dotted arrows 101 and 102. Node B performs dual-selection of these signaling packets.

Two components required for any dual feed and dual select mechanism are: 1) the ability to dual feed at one end, and 2) the ability to select appropriately from the dual fed signal at the other end. A dual feeding method for use in, e.g., DCN node A, for transmitting a signaling packet is illustrated in FIG. 7. In step 205, DCN node A identifies two diverse signaling paths for transmission of the signaling packet to node B (e.g., using information stored in the above-mentioned routing table (not shown))—a primary path and a secondary path. Referring briefly back to FIG. 1, the primary path is the communications path (101) coupling DCN node A to DCN node B (i.e., they are adjacent in the topology shown in FIG. 1), and the secondary path is the communications path (102) through DCN nodes F, E, D and C. In step 210, node A assigns a sequence number to the signaling packet. (Sequence numbers, by themselves, are known in the art. The range, or values, of sequence numbers is typically finite and repeats. For example, a 32 bit sequence number value can be used.) Every signaling packet receives a distinct sequence number from other signaling packets. In step 215, node A transmits the signaling packet to node B over the primary and secondary paths.

Figure 8:
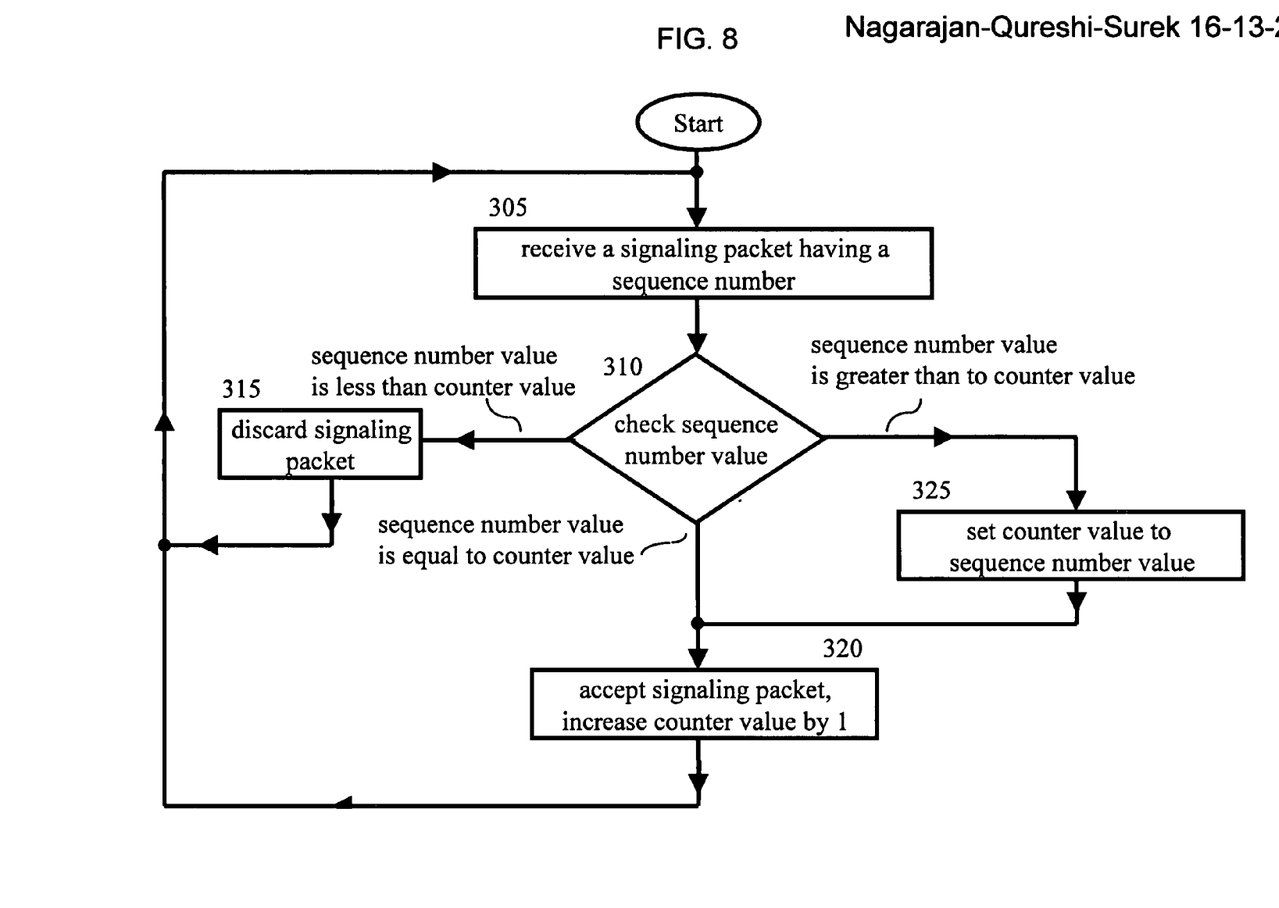

As the result of dual-feeding, at a destination node (such as DCN node B from the above dual-feeding example), each signaling packet is received at least twice. In the context of FIG. 1, DCN node B receives the signaling packet transmitted by DCN node A once from the primary path and once from the secondary path. For appropriately selecting the signaling packet exactly once, the destination node should be able to identify the duplicate signaling packets and then select one. Any selection process should take into account that duplicate signaling packets may not arrive at the same time (due to propagation delay and congestion) and also that these signaling packets may get lost (due to transmission errors and buffer overflows)—this is where the use of a sequence number in the signaling packet comes in. The use of a sequence number enables the destination to identify duplicate signaling packets. (It should be noted that other forms of identification may also be used, if desired.) A dual-select method for use in, e.g., DCN node B, for receiving a signaling packet is illustrated in FIG. 8. In step 305, DCN node B receives a signaling packet comprising a sequence number value. The destination node, e.g., DCN node B, maintains a counter (or variable) (not shown), which indicates the sequence number value of the next signaling packet it is waiting for. Note, that node B keeps a separate counter for each DCN node to which it is a neighbor in the OTN topology. (It is assumed the counter value is initialized to a predefined starting value, e.g., 0.) In step 310, DCN node B checks the value of the received sequence number value against the value of the counter. (It should be noted that because of this sequence number assignment scheme, for comparison purposes, the destination does not need to keep the first copy of any signaling packet until the second copy arrives.) If the value of the received sequence number is less than the value of the counter, DCN node B rejects the signaling packet on the basis that a copy of this signaling packet has already been received (from the other diversely routed path) in step 315 and returns to step 305 for receipt of the next signaling packet. On the other hand, when DCN node B receives a signaling packet whose sequence number value equals the counter value, then DCN node B accepts that signaling packet and increases the counter value (e.g., by one) in step 320 and returns to step 305 for receipt of the next signaling packet. Finally, when the value of the received sequence number is greater than the counter value, DCN node B sets the counter value equal to the received sequence number value in step 325 and, in step 320, accepts that signaling packet and increases the counter value (e.g., by one), and returns to step 305 for receipt of the next signaling packet. This latter branch in the flow chart of FIG. 8 illustrates the loss of a signaling packet (whether significantly delayed or dropped). This puts responsibility on the higher protocol layers to recover from any out-of-sequence/missing signaling packets. (Alternatively, other more complex procedures may be used. For example, buffer the signaling packet and wait for the signaling packets with missing sequence number(s) to arrive from the other path and then accept all the signaling packets. The time to wait for a missing signaling packet must be limited to appropriately handle the scenario when both signaling packets (duplicate) with the same sequence number get lost. This choice tries to provide a reliable transport to the higher layers at the cost of more complicated implementation of the select function. It should be noted that the higher protocol layer is still responsible for the case when both signaling packets (duplicate) with same sequence number get lost.)

It should be noted that since the sequence numbers are allocated using a finite number of bits, they have a finite maximum value and thus will be repeated in module n fashion from 0 to n−1. Given this, a mechanism is required to identify that a received packet with a sequence number less than the sequence number in the counter is either a duplicate packet or a new packet with a repeated sequence number (due to starting a new "round" of sequence numbers). It is suggested that the source pass additional information in the packet to help the destination identify the "round" of sequence numbers to which the packet belongs. This can be simply achieved by using a flag in the packet that changes when the source starts allocating sequence numbers again from the start after reaching the maximum allowable value. As such, the flow chart of FIG. 8 is suitably modified (not shown) so that the destination first checks the flag to determine if the sequence numbers have wrapped around. If the sequence numbers have not wrapped around, then the destination discards the packet with sequence number less value than the counter value (as shown in FIG. 8). However, if the sequence numbers have wrapped around, then the destination accepts the packet and updates the counter value.

Figure 9:
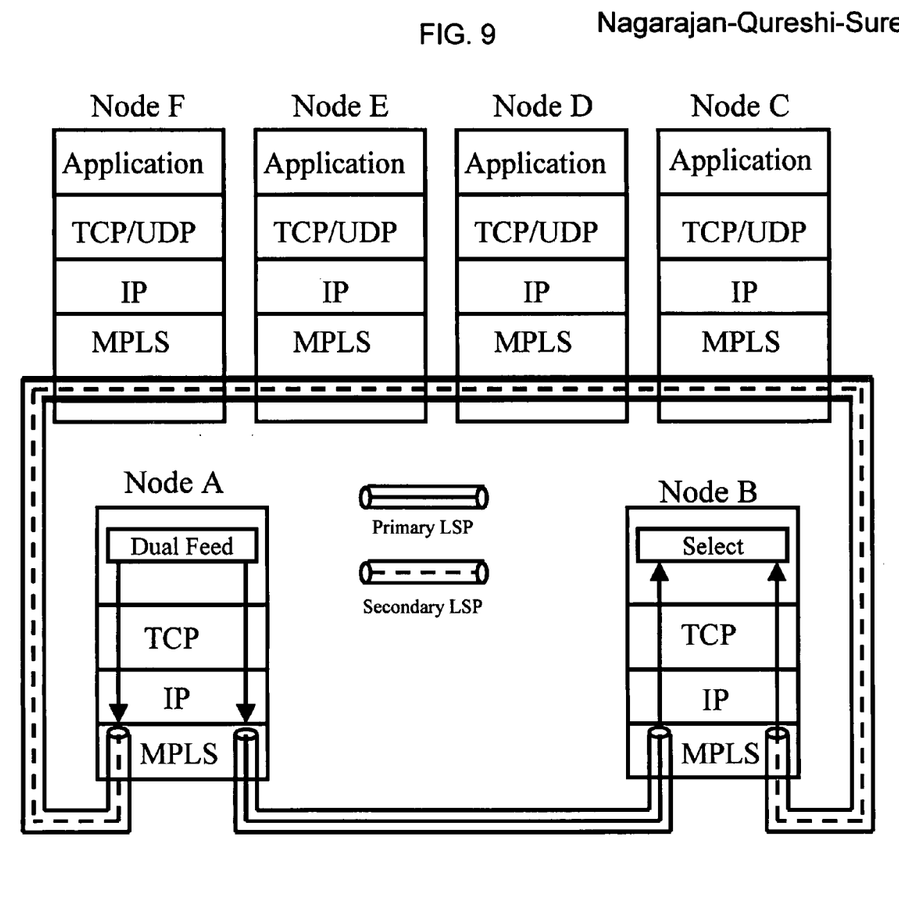
FIGS. 9 and 11 show illustrative TCP connections in the context of dual-feeding and dual-selecting between nodes A and B of FIG. 4, in accordance with the principles of the invention.
Figure 10:
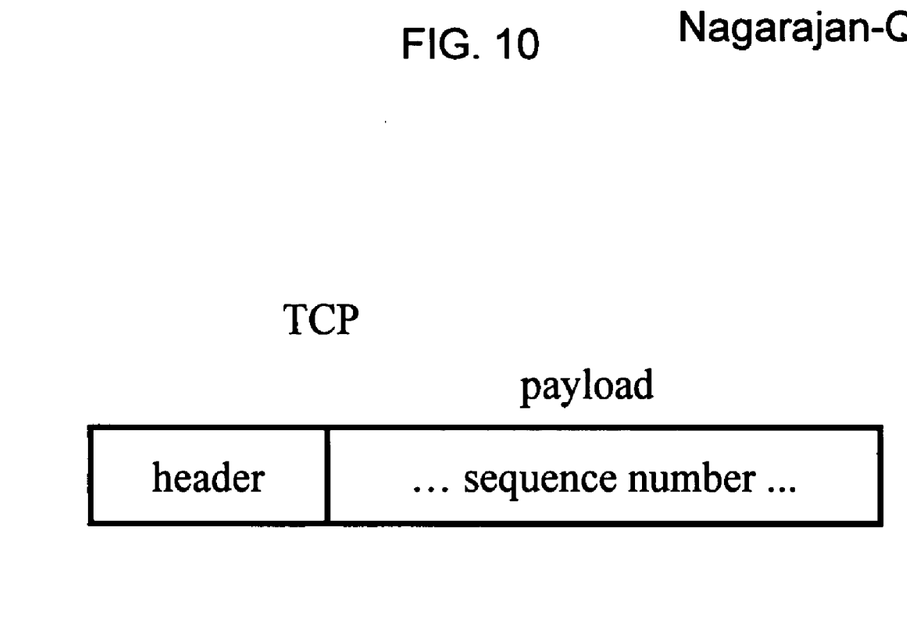
FIGS. 10 and 12 show illustrative packets comprising sequence numbers.

Turning now to FIGS. 9 and 10, two illustrative approaches are shown for realizing a DCN using dual-feeding and dual-selecting. FIG. 9 represents an illustrative implementation using two transmission control protocol (TCP) connections between each pair of DCN nodes that are neighbors according to the OTN topology. FIG. 9 illustrates this approach where nodes A and B are neighboring OTN nodes as shown in FIGS. 1 and 4. The dual feed and select function is implemented by dual feeding and then appropriately selecting from the two TCP sessions which are diversely routed using the two diversely routed LSPs. The packets from each TCP session are routed on the right LSP by using a FEC (Forwarding Equivalence Class) that comprises a destination IP address plus the TCP port number.

Figure 11:
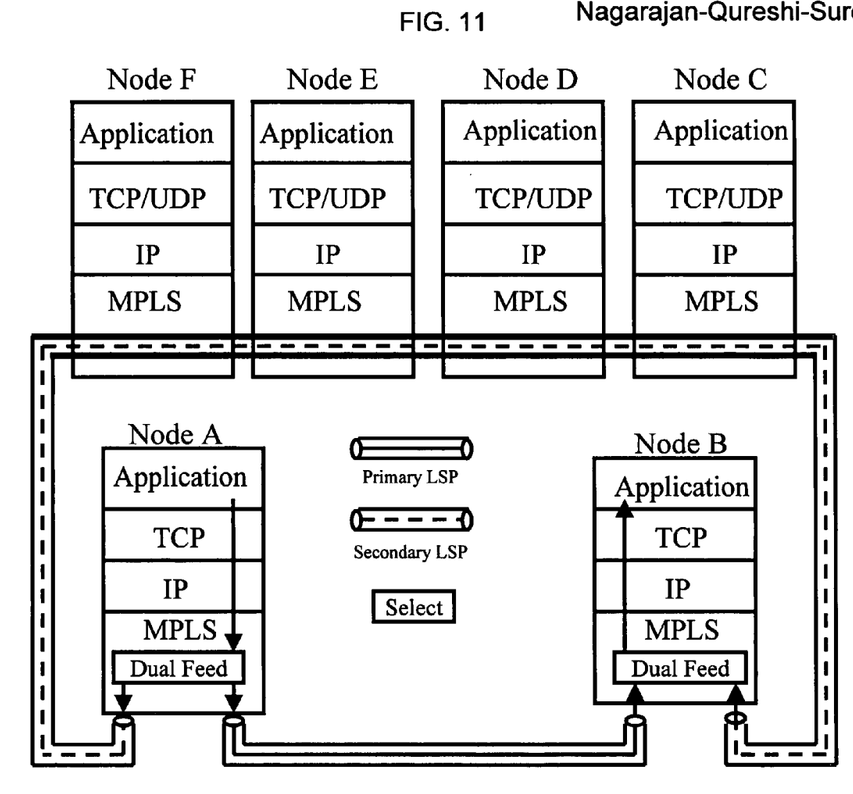
Figure 12:
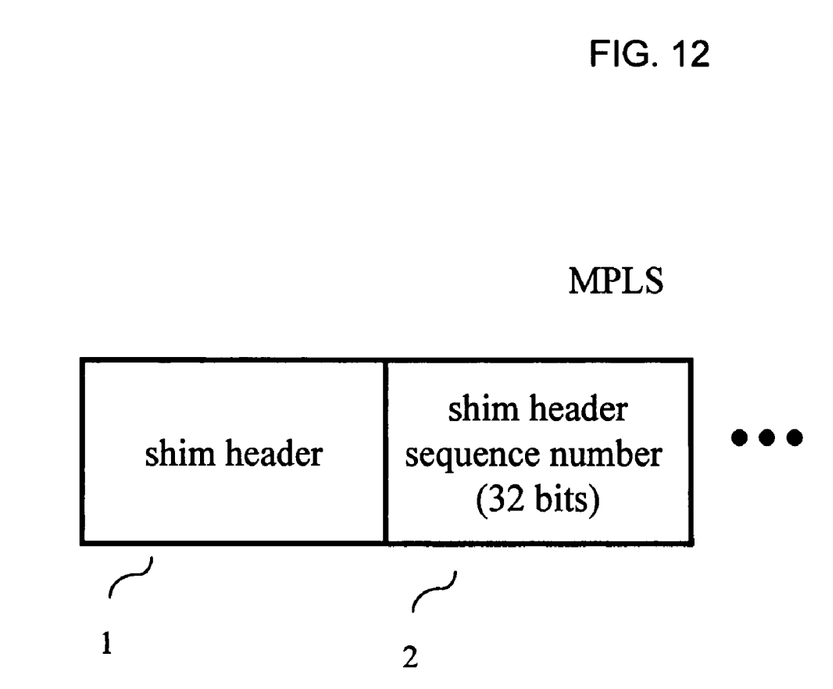

Using retransmission and buffering, TCP provides a reliable transport that delivers packets in sequence. Signaling messages requiring reliable transport can access the DCN network through a defined application programming interface (API). (Note that in this case, the application running on top of TCP is responsible for assignment of sequence numbers on one end and selection from one of the dual-fed packets on the other end. An illustrative TCP packet comprising a sequence number (32 bits wide) is shown in FIG. 10.) FIG. 11 illustrates another approach, which suggests using diversely routed LSPs with capability of dual feed and dual select. Note, that the MPLS does not have the capability to recover from loss of packets due to either transmission errors or buffer overflows. Therefore, the LSPs will see loss of packets. As noted above, implementing dual feed and select LSPs using the sequence number scheme puts responsibility of recovering from any missing/out-of-sequence packets on the above layers. To enable the higher level to recover from any packet losses, TCP sessions are used between neighboring OTN nodes. Specifically, one TCP session is established between each pair of DCN nodes, which are neighbors according to the OTN topology. Signaling packets using this TCP session are dual fed and dual selected, on to and from the diversely routed LSPs, at the ingress point and at the egress point, respectively, by the MPLS layer. Since MPLS does not provide dual feed and dual select functionality, it needs to be implemented at the MPLS layer. In the case when LSPs are established statically, conceptually, dual feed and dual select can be easily implemented by enhancing the FEC-to-label and label-to-FEC mapping functions. In the case when LSPs are dynamically established, enhancement in label distribution protocol (LDP) is also required. (Note, in this case the MPLS layer (below the IP layer) is responsible for assignment of sequence numbers on one end and selection from one of the dual-fed packets on the other end. An illustrative MPLS packet comprising a sequence number is shown in FIG. 12. As known in the art, an MPLS packet comprises an MPLS shim header 1. However, it should be noted that, and in accordance with the invention, an additional shim header 2 is used to transport the sequence number following shim header 1. As such, the existence, and use, of an additional shim header to transport the sequence number is communicated between nodes during the setup portion of LDP.)

Figure 13:
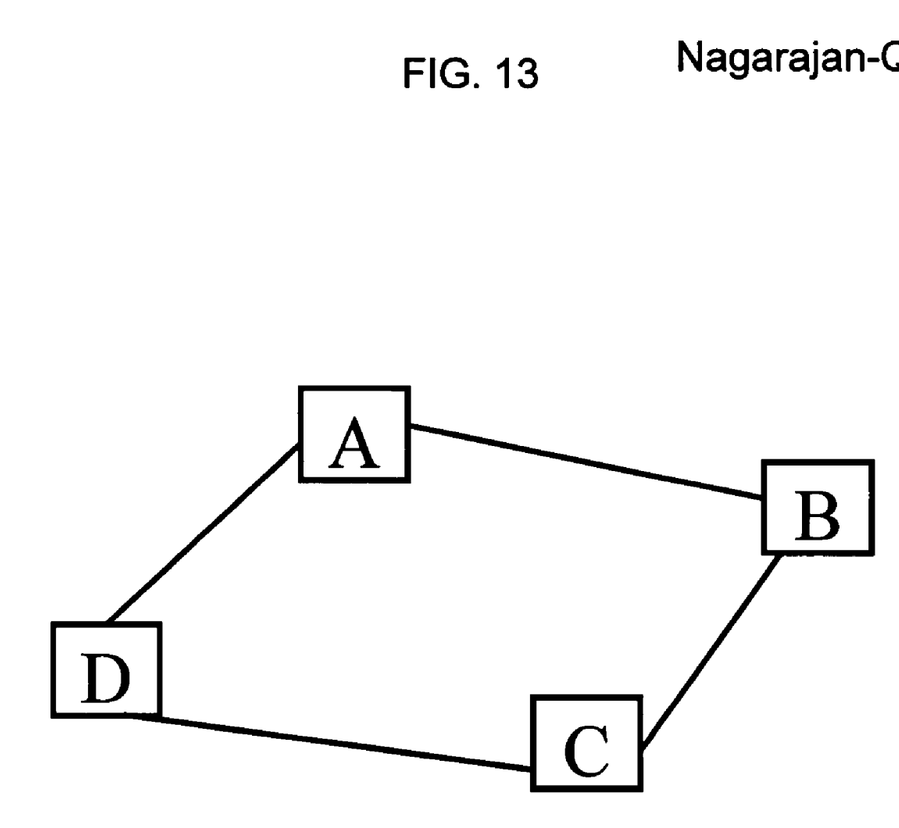
FIG. 13 shows another illustrative network topology.

In light of the above, it should be noted that without the dual feed and dual select capability, if a failure occurs in the network, the DCN is required to detect for each LSP pair which of the LSP, primary or secondary, is affected by the failure. This means that the DCN needs to first find out where the fault has occurred (possibly in the OTN network) and then, if the DCN and OTN topologies are different, correlate the fault and the LSPs to determine per LSP pair which of the LSP has been affected. For example, consider the network shown in FIG. 13. Assume for the DCN portion of the network that A-B and B-C are primary LSPs with A-D-C-B and B-A-D-C as their diversely routed paths, respectively. Further suppose failure of the link between nodes A and B. It should be observed that this failure affects not only the primary LSP between nodes A and B but also the secondary LSP between nodes B and C. Note, that in absence of the above-described dual feed and dual select capability, the DCN needs to identify such distinctions which becomes complicated when the OTN and DCN topologies are not identical.

Figure 14:
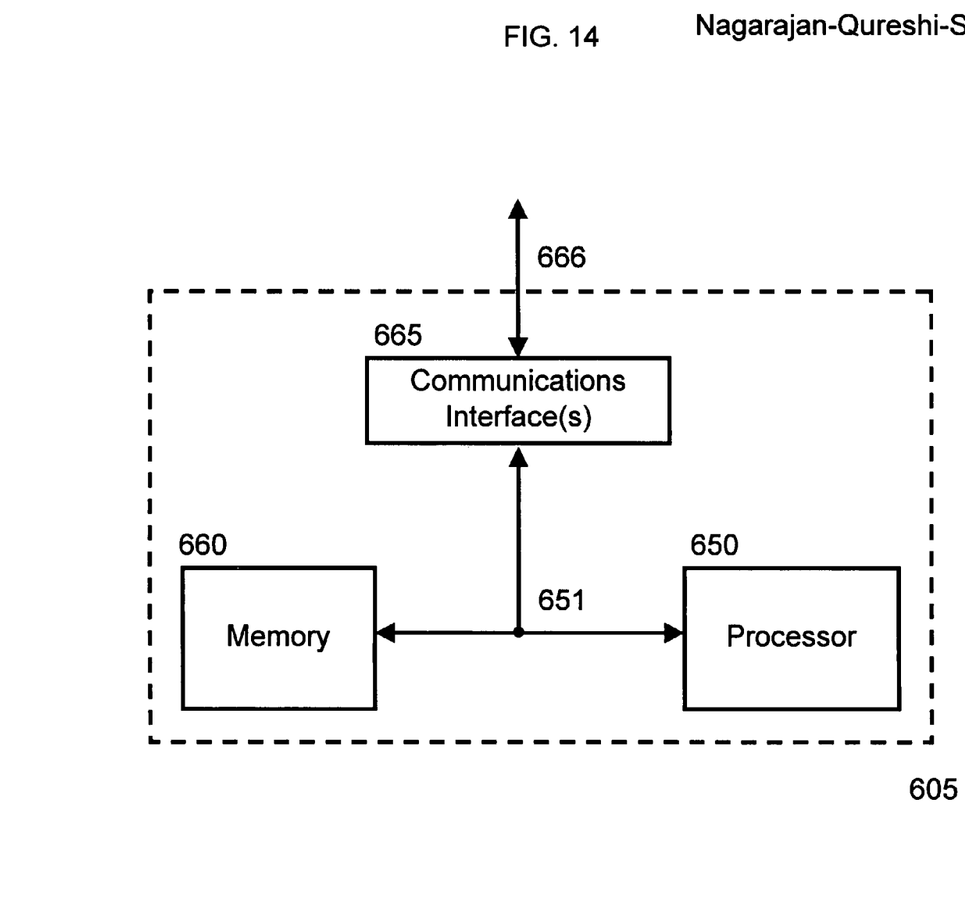
FIG. 14 shows an illustrative high-level block diagram of a node in accordance with the principles of the invention.

Turning briefly to FIG. 14, a high-level block diagram of a representative node 605 for use in accordance with the principles of the invention is shown. Node 605 is a stored-program-control based processor architecture and includes processor 650, memory 660 (for storing program instructions and data, e.g., for a routing table and for performing the above-described dual-feeding and dual-selecting illustrated in FIGS. 7 and 8, etc.) and communications interface(s) 665 for coupling to one or more communication paths as represented by path 666 (e.g., communication(s) interface 665 represents an optical dense wavelength division multiplexer (DWDM)).

As described above, the inventive concept provides a transport mechanism, for any IP-centric DCN network based, which can absorb a single failure in the DCN network with minimal, if any, impact on any signaling performance, connection setup time, and restoration time. In fact, one could state that failure detection or restoration is not required in such a DCN. However, in a more practical sense, these activities can be carried out on a slower time-scale and do not impact real-time restoration of the OTN, which is of paramount interest. Another important characteristic of the inventive concept is that it does not limit, in any way, the scalability of the DCN network. Indeed, the inventive concept provides a reliable, high performance, DCN for next-generation transport networks.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although described in the context of an IP controlled OXC-based optical transport network, the inventive concept is applicable to transport networks in general (utilizing an optical fabric and/or an electrical fabric) such as, but not limited to, PDH (Plesiochronous Digital Hierarchy); SDH (Synchronous Digital Hierarchy), Optical and other future transport network technologies. Also, although the inventive concept was illustrated in the context of a primary path and a secondary path, the inventive concept is easily extended to any number of alternate paths. Finally, although illustrated in the context of an out-of-band signaling network, the inventive concept is applicable to an in-band signaling network as well.

What is claimed is:

1. A method for use in a node of a packet network including a plurality of communication paths, the method comprising the steps of:

receiving multiple copies of a signaling packet from at least two diverse communication paths of said packet network;

calculating a counter value related to a received packet identifier;

comparing the counter value with a packet identifier in each of the multiple copies of the received signaling packet to identify the multiple copies of the signaling packet; and selecting one of the received multiple copies of the packet in response to comparing each packet identifier in the received multiple copies of the packet, wherein the one signaling packet selected is chosen without regard to the diverse communication path on which it is received.

2. The method of claim 1 wherein the packet network is a signaling network for a transport network, wherein the at least two diverse communication paths are communication paths to a neighboring node of said node, wherein the neighboring node is determined as a function of a network topology of the transport network.

3. The method of claim 1 wherein the packet identifier is a sequence number, wherein the step of selecting includes selecting the packet received first from any of said at least two diverse communication paths having a sequence number that at least matches the counter value, and wherein the method further includes the step of incrementing the counter value if the counter value is at least matched.

4. The method of claim 3 wherein the selecting step includes the steps of:
- if a value of the sequence number value of a received copy of the signaling packet is less than a counter value, discarding the received copy; and
- if the value of the sequence number value of the received copy of the signaling packet is equal to the counter value, accepting the received copy.

5. The method of claim 3 wherein the selecting step includes the steps of:
- if a value of the sequence number value of a received copy of the signaling packet is less than a counter value, discarding the received copy; and
- if the value of the sequence number value of the received copy of the signaling packet is not less than the counter value, accepting the received copy.

6. The method of claim 1 wherein the signaling packet is formatted in accordance with an Internet Protocol (IP).

7. The method of claim 1 wherein the signaling packet identifier is conveyed in an additional shim header of a multiprotocol label switching (MPLS) packet.

* * * * *